(12) United States Patent
Schmidt et al.

(10) Patent No.: US 12,024,328 B2
(45) Date of Patent: Jul. 2, 2024

(54) TABLET PORTIONING DEVICE

(71) Applicant: Gebr. Willach GmbH, Ruppichteroth (DE)

(72) Inventors: Klaus-Dieter Schmidt, Nümbrecht (DE); Jens Willach, Eitorf (DE)

(73) Assignee: Gebr. Willach GmbH, Ruppichteroth (DE)

( * ) Notice: Subject to any disclaimer, the term of this patent is extended or adjusted under 35 U.S.C. 154(b) by 617 days.

(21) Appl. No.: 17/277,922

(22) PCT Filed: Jul. 19, 2019

(86) PCT No.: PCT/EP2019/069576
§ 371 (c)(1),
(2) Date: Mar. 19, 2021

(87) PCT Pub. No.: WO2020/057807
PCT Pub. Date: Mar. 26, 2020

(65) Prior Publication Data
US 2021/0347505 A1  Nov. 11, 2021

(30) Foreign Application Priority Data
Sep. 21, 2018 (DE) .................. 10 2018 216 179.8

(51) Int. Cl.
*B65B 1/04* (2006.01)
*B65B 5/10* (2006.01)
(Continued)

(52) U.S. Cl.
CPC .............. *B65B 5/103* (2013.01); *B65B 35/08* (2013.01); *B65B 35/44* (2013.01); *B65B 59/003* (2019.05);
(Continued)

(58) Field of Classification Search
CPC ...... G07F 17/0092; G07F 11/44; G07F 11/62; G07F 11/58; G07F 11/60; B65B 5/103;
(Continued)

(56) References Cited

U.S. PATENT DOCUMENTS 1,809,001 A * 6/1931 Thoke ............... G07F 11/58
221/84
5,775,537 A * 7/1998 Doyle, Jr. ............ G07F 17/32
221/83
(Continued)

FOREIGN PATENT DOCUMENTS

| EP | 3081500 A1 * | 10/2016 | ............. B65B 57/14 |
| EP | 3081500 A1 | 10/2016 | |
| EP | 3081927 A1 | 10/2016 | |

OTHER PUBLICATIONS

International Search Report issued on Dec. 6, 2019 in corresponding International application No. PCT/EP2019/069576; 18 pages.

*Primary Examiner* — Andrew M Tecco
(74) *Attorney, Agent, or Firm* — Maier & Maier, PLLC

(57) ABSTRACT

The invention relates to a tablet portioning device comprising multiple tablet containers, a collection device arranged below the tablet container and having a dispensing device, and a packaging device for packing the tablet portions in portions, wherein the collection device receives tablets from the tablet containers and dispenses them as tablet portions via the dispensing device, wherein a conveying device having multiple conveying trays and extending in a conveying direction connects the dispensing device with the packaging device, wherein the dispensing device dispenses a respective tablet portion in one of the conveying trays and the conveying device transports the tablet portions to the packaging device, wherein the conveying device has a dispensing unit via which the tablet portions are transferred to the packaging device in portions.

18 Claims, 7 Drawing Sheets

(51) Int. Cl.
*B65B 35/08* (2006.01)
*B65B 35/44* (2006.01)
*B65B 59/00* (2006.01)
*B65G 1/137* (2006.01)
*G07F 17/00* (2006.01)

(52) U.S. Cl.
CPC ....... *B65G 1/1376* (2013.01); *G07F 17/0092* (2013.01); *B65B 2210/02* (2013.01); *B65G 2201/027* (2013.01); *B65G 2203/0283* (2013.01); *B65G 2203/046* (2013.01)

(58) Field of Classification Search
CPC ....... B65B 35/08; B65B 35/44; B65B 59/003; B65G 1/1376; B65G 2201/027; B65G 2203/0283
See application file for complete search history.

(56) References Cited

U.S. PATENT DOCUMENTS

| | | | | |
|---|---|---|---|---|
| 6,170,699 | B1 * | 1/2001 | Kim | G07F 11/58 221/253 |
| 7,779,994 | B1 * | 8/2010 | Travis | B65G 43/02 198/810.01 |
| 8,468,777 | B2 * | 6/2013 | Yuyama | B65B 5/103 221/9 |
| 2004/0182044 | A1 * | 9/2004 | Kim | G07F 11/10 53/284.7 |
| 2010/0175782 | A1 * | 7/2010 | Yuyama | B65B 57/04 141/98 |
| 2012/0290129 | A1 * | 11/2012 | Luciano, Jr. | B65B 5/103 700/244 |
| 2014/0318078 | A1 * | 10/2014 | Kondo | G16H 20/13 382/141 |
| 2018/0261314 | A1 | 9/2018 | Kim | |

* cited by examiner

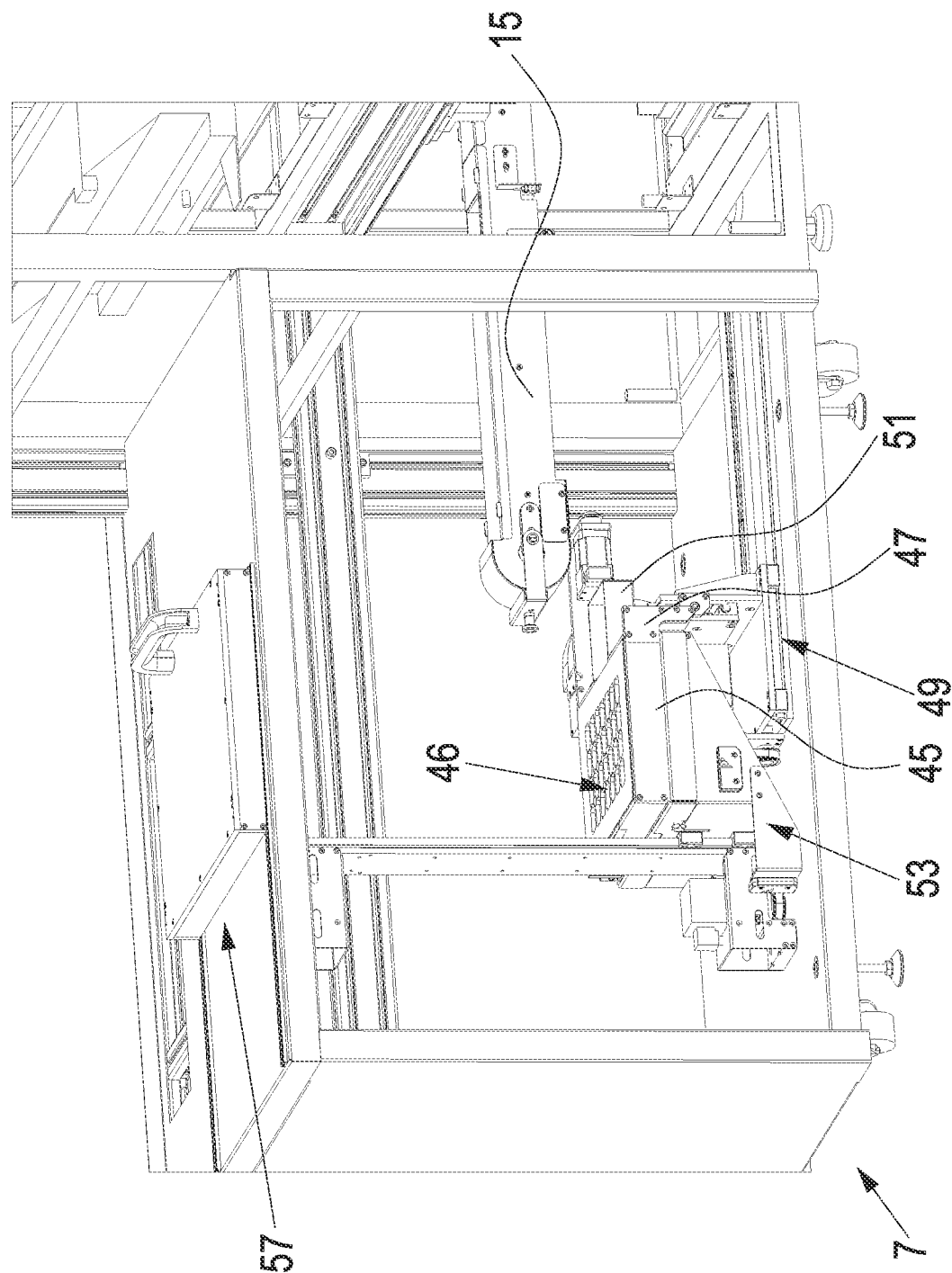

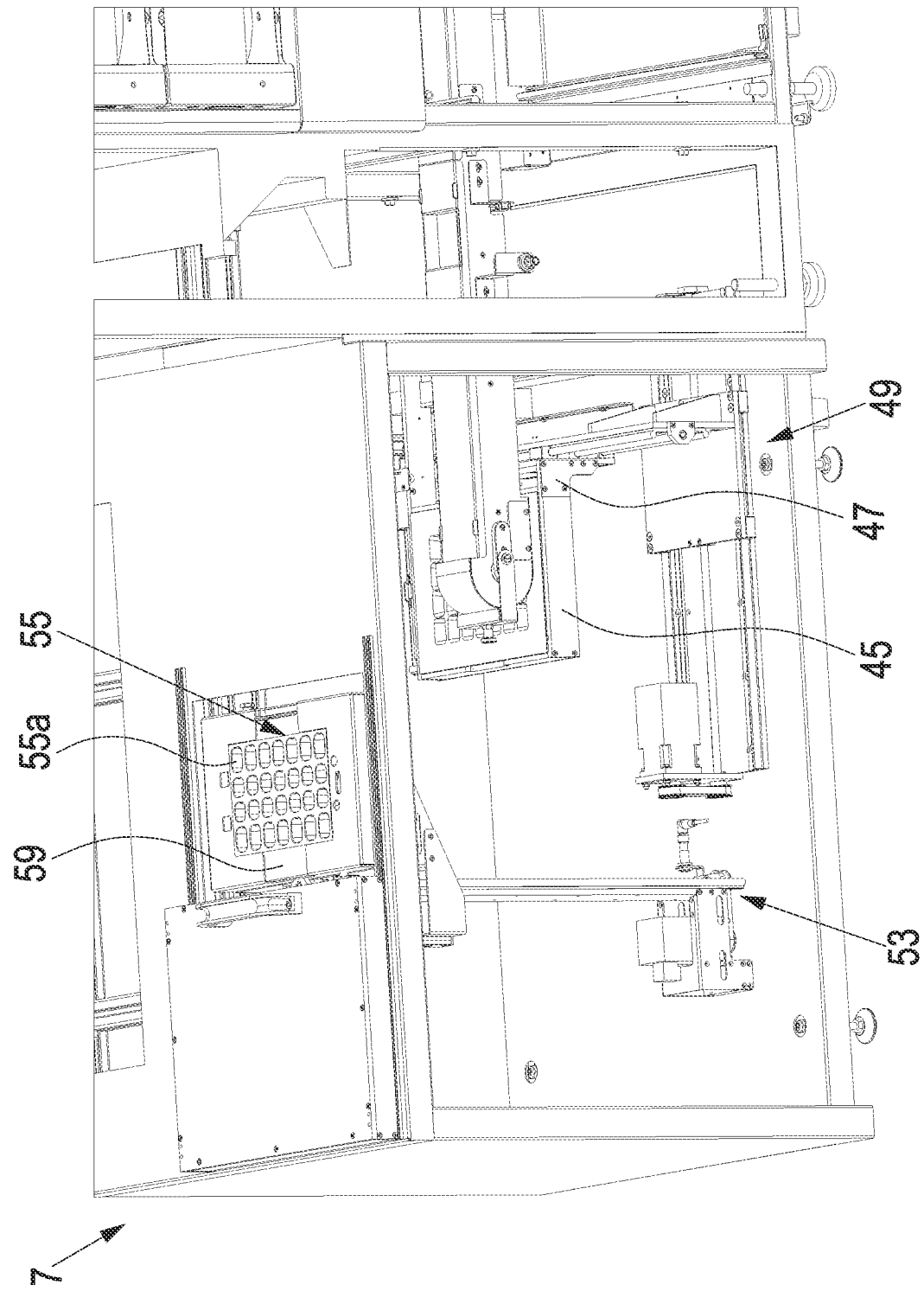

TABLET PORTIONING DEVICE

FIELD

The present invention relates to a tablet portioning device for portioning tablets.

BACKGROUND

In hospitals or pharmacies in some countries, tablets are not dispensed to patients or customers in units pre-packaged by the manufacturer, but the tablets are portioned from larger units in a manner specific to a patient or customer. In a variant, tablets of one type or different types are assorted as portions provided for a certain period during which the patient or customer takes these tablets. For example, tablet portions can be assorted for one time of taking the tablets.

Known tablet portioning devices comprise a plurality of tablet containers and a collection device with a dispensing device, arranged below the tablet containers, as well as a packaging device for packaging tablet portions. The tablets are dispensed from the tablet containers and are collected in portions in the collection device and are transferred to the packaging device. The packaging device then packages the tablet portions in individual packages, e.g., transparent bags. These may then be provided with customer- or patient-related information.

Besides being filled into small bags, tablet portions may also be filled into packages having a plurality of compartments, each tablet portion being filled into one compartment. For example, such packages take the form of trays (blister cards) and provide space for tablet portions for a plurality of intake times.

However, the known tablet portioning devices with which table portions are filled into individual bags have the drawback that in case of an interruption of the filling process due to a malfunction of the packaging device, e.g., if a roll of tablet bags has to be replaced, the entire portioning process has to be interrupted. Moreover, such a table portioning device can be used only for one type of filling, e.g., a filling into bags, whereby it cannot be used flexibly.

In the known tablet portion devices, the portioning and packaging process is also interrupted when one or a plurality of tablet containers are exchanged, at least when tablets from the tablet containers to be exchanged are needed.

SUMMARY

Therefore, it is an object of the present invention to provide a tablet portioning device of the type mentioned above, which can be used flexibly for different types of packages, wherein the tablet portioning device has a simple structure and a portioning or packaging process does not have to be interrupted immediately when the packages or the tablet container are exchanged.

The tablet portioning device of the present invention comprises a plurality of tablet containers and a collection device arranged below the tablet containers and having a dispensing device, as well as a packaging device for packaging tablet portions in portions. The collection device receives tablets from the tablet containers and dispenses the same as tablet portions via the dispensing device, wherein a conveying device having multiple conveying trays and extending in a conveying direction connects the dispensing device with the packaging device. The dispensing device dispenses a respective tablet portion into one of the conveying trays and the conveying device transports the tablet portions to the packaging device. The conveying device has a dispensing unit via which the tablet portions are transferred to the packaging device in portions.

In other words: The tablet portions are portioned by the collection device and the dispensing device and are dispensed into the conveying trays, and each tablet portion is transferred by the dispensing device as a complete portion to the packaging device Preferably, each tablet portion is transferred at least in part by means of gravity to the packaging device via the dispensing device. For example, it may be provided that the dispensing device empties a conveying tray or that the conveying tray is emptied using gravity. The tablets may then, e.g., fall into the packaging device under the effect of gravity.

By providing a conveying device having a plurality of conveying trays, a buffer is created so that, e.g., when the tablet containers are exchanged, the transfer process to the packaging device and the packaging process can be continued for a certain time. Further, a plurality of conveying trays offers the possibility to build a buffer of tablet portions, if, for example, the packaging process of the packaging device is interrupted. Thus, during the interruption of the packaging process of the packaging device, tablets can already be portioned. Designing the conveying device with a dispensing device via which the tablet portions are transferred to the packaging device using gravity, allows for a simple structure of the conveying device, as well as of the packaging device, wherein the packaging device merely has to allow for receiving tablet portions from above.

Preferably, the dispensing device is configured as a dispensing head arranged at a first end of the conveying device.

Furthermore, in the tablet portioning device of the present invention, due to the conveying device, the unit that performs the tablet portioning and comprises the tablet containers and the collection device having the dispensing device, is spatially separated from the packaging device so that the packaging device can be arranged, e.g., beside the portioning unit. The packaging device can thus be designed with relative freedom with respect to size and is not limited by size specifications set by the part of the tablet portioning device performing the portioning. Thereby, the tablet portioning device of the present invention can be deigned flexibly, and different packaging devices can be used. Further, due to the conveying device having a dispensing device via which the tablet portions are transferred to the packaging device using gravity, a fast transfer of tablet portions is possible.

The tablet containers of a tablet portioning device of the present invention typically dispense tablets individually to the collection device. Of course, it is also possible that a tablet container dispenses multiple tablets at a time.

Preferably, it is provided that the conveying device is supported on a rail device and can be moved via the rail device in a horizontal direction transverse to the conveying direction of the conveying device from a transport position, in which the conveying device transports tablet portions from the dispensing device to the packaging device, to a parking position. In other words: The conveying device can be displaced so that it is no longer situated below the dispensing device of the collection device. In the parking position of the conveying device, the dispensing device of the collection device can thus be accessed better or freely so that, for example, maintenance of the dispensing device can be performed in a simple manner. Moreover, by moving the conveying device to the parking position, the region below the collection device having the dispensing device is cleared so that a further device, such as a packing device for tablet portions, can be arranged the dispensing device.

Preferably, it is provided that the dispensing device comprises a controllable outlet via which the tablet portions can be dispensed in a controlled manner. Thereby, tablet portions collected in the collection device can be dispensed in an advantageous manner and at a predetermined time and, for example, be dispensed to the conveying device.

The controllable outlet may e.g., comprise a pivotable closure plate. Using a pivotable closure plate, the controllable outlet can be realized in a structurally simple manner. Here, it may be provided that the pivotable closure plate is pivotable in a horizontal plane. In this manner, the controllable outlet can be realized in a space-saving manner, wherein in particular the installation height of the dispensing device can be kept small.

The collection device may comprise a funnel device connected with the dispensing device. Thus, the tablet portioning device of the present invention can be realized in a structurally simple manner by arranging the tablet containers above the collection device, and the tablets can be dispensed in a simple manner and be caught by the funnel device of the collection device and be guided to the dispensing device.

In a particularly preferred embodiment of the present invention a movable packing device is provided which, in the parking position of the conveying device, can be arranged below the dispensing device to receive tablet portions from the dispensing device, wherein the packing device is movable from a use position below the dispensing device to a stow position to clear a region below the collection device for the conveying device. In other words: Besides the packaging device, the tablet portioning device may provide a packing device which, in the parking position of the conveying device, is arranged below the collection device. Thus, the tablet portioning device of the present invention is particularly flexible to use, since different devices for packaging or packing tablet portions can be provided. For example, the packing device may pack the tablet portions into individual packaging bags. The packaging device can, e.g., package the tablet portions in packages with multiple compartments.

Preferably, it is provided that the conveying device is formed by an endless studded belt with protruding studs spaced from one another by a distance D, two adjacent studs respectively delimiting a respective one of the conveying trays on at least two sides. In other words: A conveying tray extends in the conveying direction over a length with the amount D. Using an endless studded belt, the conveying device of the tablet portioning device of the present invention can be realized in a structurally simple manner, the studs advantageously forming the conveying trays. Furthermore, a conveying device of such design is very space-saving. The endless studded belt further allows the tablet portions to be advantageously transported in the conveying trays, wherein, in a circulation region of the studded belt, the tablet portions fall automatically from the conveying trays under the effect of gravity. Moreover, in case of a malfunction of the tablet portioning device, in which e.g., no tablets have been dispensed into a conveying tray, the endless studded belt allows the conveying device to also be operated in a direction opposite to the conveying direction in a simple manner, so as to catch up on filling that conveying tray. Thereby, the conveying device of the tablet portioning device of the present invention can be used in an advantageous manner and flexibly.

In a preferred embodiment of the invention, it is provided that the conveying device has side walls that are arranged laterally beside the studded belt and delimit the conveying trays on two further sides at least in a transport region of the studded belt. In other words: The conveying trays are delimited by the studs circulating with the studded belt as well as by the side walls of the conveying device which are preferably stationary. The side walls of the conveying device may protrude in a direction orthogonal to the conveying tray bottom in particular beyond the conveying tray bottom formed by the studded belt by a height H, wherein the height H preferably corresponds at least to the height h of the studs.

The side walls of the conveying device may be connected with each other also above the studded belt, so that a kind of cover is formed. Thereby, it is avoided that dirt gets into the conveying trays and thus reaches the tablet portions.

In one embodiment of the present invention, it may be provided that the height h of the studs is smaller than the distance D between the studs. In other words: The studs have a relatively small height h, so that a small installation space may be guaranteed for the conveying device. Especially, if a cover is provided that connects the side walls with each other above a studded belt, the risk of tablets jumping from one conveying try into another when the conveying device is started or stopped is kept low. The height h of the studs may thus be chosen to be relatively small.

Preferably, the dispensing device, which is preferably configured as a dispensing head, is arranged at a first deflection region of the studded belt. The first deflection region is understood as at least that region of the studded belt that is bent by deflection in a first end section. However, the dispensing device may generally extend over a larger region of the studded belt.

Preferably, the dispensing device, which is preferably configured as a dispensing head, is in contact with the side walls at least in the first deflection region and connects the same with each other, wherein the dispensing device covers a conveying tray present in the first deflection region. It is thereby achieved that the dispensing device first prevents the tablet portions from falling from the conveying tray present in the deflection region under the effect of gravity, so that the tablet portions do not already fall from the corresponding conveying tray in the deflection region. The time and the site of the falling of the tablet portion can thus be defined clearly, so that it takes place only downstream of the dispensing device or in a recessed region of the dispensing device.

Preferably, it is provided that the dispensing device, which is preferably configured as a dispensing head, extends by a length L starting from the first deflection region below a lower run of the studded belt and forms a transfer region, wherein the length L corresponds to at least the distance D between two adjacent studs, wherein the dispensing device has a transfer opening in the transfer region. Thus, the dispensing device defines the transfer position for the tablet portions and thus the site at which the tablet portions fall from the conveying device under the effect of gravity, wherein this position is located in the region of the lower run of the studded belt. Thereby, it can be guaranteed that the transfer of the tablet portions to the packaging device is performed reliably.

Using the dispensing device, which is preferably configured as a dispensing head, it can be achieved, as described above, that the conveying tray located in the deflection region of the studded belt is covered, so that a tablet portion present therein has not yet fallen from the conveying tray. Thereby, it can be achieved that, for example, in case of a malfunction which requires a calibration of the studded belt, the same can be moved backward by e.g., one conveying tray without any uncertainty about whether the tray present in the deflection region has been emptied or not. Thus, even in case of a malfunction of the tablet portioning device which requires a recalibration of the conveying device, the packaging process can be continued without requiring any check. Here, the studded belt is calibrated by reversing the studded belt by e.g., one conveying tray.

For a calibration of the studded belt, it may be provided that a RFID chip is arranged in each stud of the studded belt. The same may be read by a stationary sensor which is arranged e.g., at one of the side walls. When the studded belt is reversed by e.g., one conveying tray, it is ensured that a stud passes the sensor so that the position of the studded belt can be detected by the RFID chip detected. Basically, it is also possible that not every stud has a RFID chip arranged therein, but only some of the studs. In this case, however, it is necessary for a calibration that the studded belt is displaced until the sensor detects a RFID chip in a stud so that the above-described advantageous function, according to which no erroneous filling takes place, is not necessarily given. Generally, it would also be sufficient to arrange a RFID chip in only one stud, wherein, in this case, the studded belt has to be reversed possibly over a long distance for calibration, depending on the position of the studded belt at the time of a malfunction.

Generally, other possibilities for a calibration of the studded belt are also conceivable. Instead of an RFID chip, optical markers may e.g., be provided on the studs, which are sensed by an optical sensor. For a calibration of the studded belt, it is basically only necessary to determine a definitive position of a defined stud.

Preferably, it is provided that the transfer opening of the dispensing device, which is preferably configured as a dispensing head, is adapted to the size of an opening of a package or to the size of a filling opening of the packaging device. In this manner it can be ensured that a tablet portion received in a conveying tray is reliably transferred into the package or falls into the filling opening of a package.

Preferably, it is provided that the packaging device comprises multiple filling trays each having one filling opening, their arrangement being adapted to a package with multiple compartments (e.g., a blister card), wherein the bottoms of the filling trays are formed by one or more slides via which the filling trays can be opened at their bottom side, and wherein the tablet portions can each be filled into one of the filling trays, respectively. Using multiple filling trays, packages with a plurality of compartments can be filled in an advantageous manner. For example, the filling trays of the packaging device may be filled first, before the tablet portions are then transferred into the package by opening the bottoms via the slide or the slides. By providing the filling trays of the packaging device, a buffer can be realized, so that the filling trays can be filled e.g., without a package already being in its filling position. Thus, for example, a previously filled package can be dispensed or removed without a process of filling the packaging device having to be interrupted. Thereby, an advantageous filling of packages is possible.

The invention can provide that the filling trays are arranged at a table that is movable in two horizontal directions. Thus, the filling trays are advantageously movable by means of the movable table and can be positioned below the transfer opening of the dispensing device, which is preferably configured as a dispensing head. In this way, the filling trays can be filled with tablet portions in an advantageous manner by positioning a filling tray below the transfer opening of the dispensing device and thereafter moving the conveying device in the conveying direction so that a conveying tray filled with a tablet portion is located in the region of the transfer opening. The tablet portions present in the conveying tray fall from the conveying tray into the filling tray of the packaging device under the effect of gravity. Thereafter, another filling tray can be positioned below the conveying device by means of the table and the conveying device is operated again. In this manner a transfer of tablet portions from the conveying device to the packaging device is performed in a particularly advantageous manner.

The invention may advantageously provide that the packaging device comprises a package holder for holding a package in a filling position, wherein the table can be positioned above the package holder for the purpose of filling the package. Using the package holder, a package with multiple compartments can be positioned below the table in a particularly advantageous manner. When all or a part of the filling trays of the table are filled with tablet portions, one of the slides or the slide can be moved so that the tablet portions fall from the filling trays into the compartments of the package.

Here, it may be provided that, after filling, the package holder transports the package from the filling position to a removal position. Thus, via the package holder, the package may be positioned for removal in an advantageous manner. At the same time, filling the filling trays in the table can be continued during the operation of removing the package, with the slide or the slides being in the closed position.

The packaging device may comprise a removal device at which the package can be sealed, wherein the removal position of the package is located in the removal device.

The package holder may for example be configured as a lift that lifts the package to the removal position so that the same is arranged at a comfortable height for a user.

The package holder may comprise a bottom extending below the packaging. this has the advantage that, if a package is not placed correctly or not at all into the package holder and the filling process is continued, the tablet portions falling from the conveying trays can be caught by the package holder and are thus not spilled.

The invention may provide that the table has a waste tray. For example, incorrectly portioned tablet portions can be filled into the waste tray. Using the table, the waste tray can be positioned below the transfer opening. If it is determined during the operation of the tablet portioning device that a wrong tablet portion has been filled into a conveying tray of the conveying device, it is thus possible to fill the wrong tablet portion into the waste tray without a protracted interruption.

Basically, it may also be provided in the tablet portioning device of the present invention that the table receives a package so that no filling trays and slides are provided. In this case, the tablet portions are filled directly from the conveying device into the compartments of the package. In this case, the movable table acts as the package holder.

Preferably, it is provided that the table is fastened to a drive device by two laterally opposite L-shaped brackets arranged at the table, wherein the slide or the slides for opening the bottoms of the filling trays can be moved between the L-shaped brackets. Such a structure has proven particularly advantageous, since it allows for a space-saving structure. By providing the L-shaped brackets, a recess is formed through which the slides for opening the bottoms of the filling trays can be moved so that the slides can advantageously be moved towards the brackets and thus towards the fastening of the table. Therefore, the table is accessible in an advantageous manner from up to five sides so that the package holder can be guided below the table in an advantageous manner. This allows for a space-saving structure of the tablet portioning device.

In a particularly preferred embodiment of the invention, it is provided that a camera is arranged above the conveying device, which is directed towards the conveying device. Using the camera, image data of the conveying trays and their contents can be obtained, via which a content of the conveying trays can be determined by image analysis. In this manner, it may be checked which tablets or tablet portions are present in the conveying trays. In a conveying device having a cover, the cover has a recess through which the camera can view the conveying trays.

In a tablet portioning device of the present invention, it may be provided in an advantageous manner that, in the transport position of the conveying device, the dispensing device is spaced in the conveying direction by a distance A, which is at least equal to the distance D, from a second deflection region of the studded belt. Here, the second deflection region is at least the region of the studded belt that is bent by a deflection in a second end section of the conveying device that is arranged below the dispensing device. Due to the distance A, which is at least equal to the distance D, a buffer tray is formed upstream of the dispensing device in the transporting direction, so that e.g., in case of a calibration, the studded belt can be moved against the conveying direction. Thus, it is prevented that a conveying tray previously present below the dispensing device, which has been filled with a tablet portion, reaches the deflection region by moving the studded belt by one conveying tray opposite to the conveying direction and that the tablet portion present in the conveying tray can fall out there. Basically, it is also possible that the dispensing device directly adjoins the deflection region in the conveying direction, in which case the deflection is preferably covered to form a buffer tray.

In this manner, calibrating the studded belt is possible in an advantageous manner.

The invention further relates to a tablet portioning device with multiple tablet containers comprising a collection device arranged below the tablet containers and having a dispensing device and with a packing device for packing tablet portions. The collection device receives tablets from the tablet containers and dispenses the same as a tablet portion via the dispensing device. The packing device is arranged below the dispensing device when in a use position and receives the tablet portions from the dispensing device. The packing device can be moved from the use position to a stow position to clear the region below the collection device. The tablet portioning device further comprises a conveying device with a plurality of conveying trays, wherein, in the stow position of the packing device, the dispensing device can be connected with a packaging device via the conveying device, wherein the dispensing device dispenses one tablet portion into one of the conveying trays, respectively, and the conveying device transports the tablet portions to the packaging device. The conveying device is supported on a rail device to be moved via the rail device in a horizontal direction transverse to the conveying direction of the conveying device from a transport position, in which the conveying device transports tablet portions from the dispensing device to the packaging device, to a parking position.

The tablet portioning device of the present invention comprising a packing device and a packaging device offers the possibility to appropriately handle tablet portions in a packing device in which the tablet portions are packed into bags in portions, for example, or in a packaging device in which the tablet portions are packaged in multiple compartments of a packaging (e.g., a blister card).

The tablet portioning device of the present invention comprising a packing device and a packaging device thus offers a particularly flexible use. By displacing the conveying device on a rail device in a horizontal direction transverse to the conveying direction of the conveying device, space can be cleared in a simple manner below the dispensing device so that the packing device can be moved to its use position below the dispensing device. If tablet portions are to be handled via the packaging device, the packing device can be moved in its stow position so that there is sufficient space below the dispensing device for moving the conveying device from its parking position to the transport position. In this setting of the tablet portioning device of the present invention, the tablets are now dispensed from the dispensing device onto the conveying device and are transported to the packaging device by the same.

In the tablet portioning device of the present invention comprising a packing device and a packaging device, the conveying device preferably comprises a dispensing device via which the tablet portions are transferred to the packaging device in portions.

In other words: The tablet portions can be dispensed from the collection device and the dispensing device in portions into the conveying trays, and each tablet portion is then transferred as a whole to the packaging device. by the dispensing device.

Preferably, each tablet portion is transferred at least in part by means of gravity to the packaging device via the dispensing device. For example, it may be provided that the dispensing device empties a conveying tray or that the conveying tray is emptied using gravity. The tablets may then, e.g., fall into the packaging device under the effect of gravity.

Designing the conveying device with a dispensing device via which the tablet portions are transferred to the packaging device using gravity, allows for a simple structure of the conveying device, as well as of the packaging device, wherein the packaging device merely has to allow for receiving tablet portions from above. Further, using the conveying device having a dispensing device via which the tablet portions are transferred to the packaging device by means of gravity, a fast transfer of the tablet portions is possible.

Preferably, the dispensing device is configured as a dispensing head arranged at a first end of the conveying device.

In the tablet portioning device of the present invention comprising a packing device and a packaging device, it is preferably provided that the dispensing device comprises a controllable outlet via which the tablet portions can be dispensed in a controlled manner. Thereby, tablet portions collected in the collection device can be dispensed in an advantageous manner and at a predetermined time and, for example, be dispensed to the conveying device.

In the tablet portioning device of the present invention comprising a packing device and a packaging device, the controllable outlet may e.g., comprise a pivotable closure plate. Using a pivotable closure plate, the controllable outlet can be realized in a structurally simple manner. Here, it may be provided that the pivotable closure plate is pivotable in a horizontal plane. In this manner, the controllable outlet can be realized in a space-saving manner, wherein in particular the installation height of the dispensing device can be kept small.

In the tablet portioning device of the present invention comprising a packing device and a packaging device, the collection device may comprise a funnel device connected with the dispensing device. Thus, the tablet portioning device of the present invention can be realized in a structurally simple manner by arranging the tablet containers above the collection device, and the tablets can be dispensed in a simple manner and be caught by the funnel device of the collection device and be guided to the dispensing device.

In the tablet portioning device of the present invention comprising a packing device and a packaging device, it is preferably provided that the conveying device is formed by an endless studded belt with protruding studs spaced from one another by a distance D, two adjacent studs respectively delimiting one respective conveying trays on at least two sides. In other words: A conveying tray extends in the conveying direction over a length with the amount D. Using an endless studded belt, the conveying device of the tablet portioning device of the present invention can be realized in a structurally simple manner, the studs advantageously forming the conveying trays. Furthermore, a conveying device of such design is very spacesaving. The endless studded belt further allows the tablet portions to be advantageously transported in the conveying trays, wherein, in a circulation region of the studded belt, the tablet portions fall automatically from the conveying trays under the effect of gravity. Moreover, in case of a malfunction of the tablet portioning device, in which e.g., no tablets have been dispensed into a conveying tray, the endless studded belt allows the conveying device to also be operated in a direction opposite to the conveying direction in a simple manner, so as to catch up on filling that conveying tray. Thereby, the conveying device of the tablet portioning device of the present invention can be used in an advantageous manner and flexibly.

In a preferred embodiment of the tablet portioning device of the present invention comprising a packing device and a packaging device, it is provided that the conveying device has side walls that are arranged laterally beside the studded belt and delimit the conveying trays on two further sides at least in a transport region of the studded belt. In other words: The conveying trays are delimited by the studs circulating with the studded belt as well as by the side walls of the conveying device which are preferably stationary. The side walls of the conveying device may protrude in a direction orthogonal to the conveying tray bottom in particular beyond the conveying tray bottom formed by the studded belt by a height H, wherein the height H preferably corresponds at least to the height h of the studs.

In the tablet portioning device of the present invention comprising a packing device and a packaging device, the side walls of the conveying device may be connected with each other also above the studded belt, so that a kind of cover is formed. Thereby, it is avoided that dirt gets into the conveying trays and thus reaches the tablet portions.

In one embodiment of the present invention, it may be provided that the height h of the studs is smaller than the distance D between the studs. In other words: The studs have a relatively small height h, so that a small installation space may be guaranteed for the conveying device. Especially, if a cover is provided that connects the side walls with each other above a studded belt, the risk of tablets jumping from one conveying try into another when the conveying device is started or stopped is kept low. The height h of the studs may thus be chosen to be relatively small.

In the tablet portioning device of the present invention comprising a packing device and a packaging device, the dispensing device, which is preferably configured as a dispensing head, is preferably arranged at a first deflection region of the studded belt. The first deflection region is understood as at least that region of the studded belt that is bent by deflection in a first end section. However, the dispensing device may generally extend over a larger region of the studded belt.

In the tablet portioning device of the present invention comprising a packing device and a packaging device, the dispensing device, which is preferably configured as a dispensing head, is in contact with the side walls preferably at least in the first deflection region and connects the same with each other, wherein the dispensing device covers a conveying tray present in the deflection region. It is thereby achieved that the dispensing device first prevents the tablet portions from falling from the conveying tray present in the deflection region under the effect of gravity, so that the tablet portions do not already fall from the corresponding conveying tray in the deflection region. The time and the site of the falling of the tablet portion can thus be defined clearly, so that it takes place only downstream of the dispensing device or in a recessed region of the dispensing device.

In the tablet portioning device of the present invention comprising a packing device and a packaging device, it is preferably provided that the dispensing device, which is preferably configured as a dispensing head, extends by a length L starting from the first deflection region below a lower run of the studded belt and forms a transfer region, wherein the length L corresponds to at least the distance D between two adjacent studs, wherein the dispensing device has a transfer opening in the transfer region. Thus, the dispensing device defines the transfer position for the tablet portions and thus the site at which the tablet portions fall from the conveying device under the effect of gravity, wherein this position is located in the region of the lower run of the studded belt. Thereby, it can be guaranteed that the transfer of the tablet portions to the packaging device is performed reliably. Using the dispensing device, which is preferably configured as a dispensing head, it can be achieved, as described above, that the conveying tray located in the deflection region of the studded belt is covered, so that a tablet portion present therein has not yet fallen from the conveying tray. Thereby, it can be achieved that, for example, in case of a malfunction which requires a calibration of the studded belt, the same can be moved backward by e.g., one conveying tray without any uncertainty about whether the tray present in the deflection region has been emptied or not. Thus, even in case of a malfunction of the tablet portioning device which requires a recalibration of the conveying device, the packaging process can be continued without requiring any check. Here, the studded belt is calibrated by reversing the studded belt by e.g., one conveying tray.

In the tablet portioning device of the present invention comprising a packing device and a packaging device, it may be provided for a calibration of the studded belt, it may be provided that a RFID chip is arranged in each stud of the studded belt. The same may be read by a stationary sensor which is arranged e.g., at one of the side walls. When the studded belt is reversed by e.g., one conveying tray, it is ensured that a stud passes the sensor so that the position of the studded belt can be detected by the RFID chip detected. Basically, it is also possible that not every stud has a RFID chip arranged therein, but only some of the studs. In this case, however, it is necessary for a calibration that the studded belt is displaced until the sensor detects a RFID chip in a stud so that the above-described advantageous function, according to which no erroneous filling takes place, is not necessarily given. Generally, it would also be sufficient to arrange a RFID chip in only one stud, wherein, in this case, the studded belt has to be reversed possibly over a long distance for calibration, depending on the position of the studded belt at the time of a malfunction.

Generally, in the tablet portioning device of the present invention comprising a packing device and a packaging device, other possibilities for a calibration of the studded belt are also conceivable. Instead of an RFID chip, optical markers may e.g., be provided on the studs, which are sensed by an optical sensor. For a calibration of the studded belt, it is basically only necessary to determine a definitive position of a defined stud.

In the tablet portioning device of the present invention comprising a packing device and a packaging device, it is preferably provided that the transfer opening of the dispensing device, which is preferably configured as a dispensing head, is adapted to the size of an opening of a package or to the size of a filling opening of the packaging device. In this manner, it can be ensured that a tablet portion received in a conveying tray is reliably transferred into the package or falls into the filling opening of a package.

In the tablet portioning device of the present invention comprising a packing device and a packaging device, it is preferably provided that the packaging device comprises multiple filling trays each having one filling opening, their arrangement being adapted to a package with multiple compartments (e.g. a blister card), wherein the bottoms of the filling trays are formed by one or more slides via which the filling trays can be opened at their bottom side, and wherein the tablet portions can each be filled into one of the filling trays, respectively. Using multiple filling trays, packages with a plurality of compartments can be filled in an advantageous manner. For example, the filling trays of the packaging device may be filled first, before the tablet portions are then transferred into the package by opening the bottoms via the slide or the slides. By providing the filling trays of the packaging device, a buffer can be realized, so that the filling trays can be filled e.g., without a package already being in its filling position. Thus, for example, a previously filled package can be dispensed or removed without a process of filling the packaging device having to be interrupted. Thereby, an advantageous filling of packages is possible.

In the tablet portioning device of the present invention comprising a packing device and a packaging device, it can be provided that the filling trays are arranged at a table that is movable in two horizontal directions. Thus, the filling trays are advantageously movable by means of the movable table and can be positioned below the transfer opening of the dispensing device, which is preferably configured as a dispensing head. In this way, the filling trays can be filled with tablet portions in an advantageous manner by positioning a filling tray below the transfer opening of the dispensing device and thereafter moving the conveying device in the conveying direction so that a conveying tray filled with a tablet portion is located in the region of the transfer opening. The tablet portions present in the conveying tray fall from the conveying tray into the filling tray of the packaging device under the effect of gravity. Thereafter, another filling tray can be positioned below the conveying device by means of the table and the conveying device is operated again. In this manner a transfer of tablet portions from the conveying device to the packaging device is performed in a particularly advantageous manner.

In the tablet portioning device of the present invention comprising a packing device and a packaging device, it can advantageously be provided that the packaging device comprises a package holder for holding a package in a filling position, wherein the table can be positioned above the package holder for the purpose of filling the package. Using the package holder, a package with multiple compartments can be positioned below the table in a particularly advantageous manner. When all or a part of the filling trays of the table are filled with tablet portions, one of the slides or the slide can be moved so that the tablet portions fall from the filling trays into the compartments of the package. Here, it may be provided that, after filling, the package holder transports the package from the filling position to a removal position. Thus, via the package holder, the package may be positioned for removal in an advantageous manner. At the same time, filling the filling trays in the table can be continued during the operation of removing the package, with the slide or the slides being in the closed position. The packaging device may comprise a removal device at which the package can be sealed, wherein the removal position of the package is located in the removal device. The package holder may for example be configured as a lift that lifts the package to the removal position so that the same is arranged at a comfortable height for a user. The package holder may comprise a bottom extending below the packaging. this has the advantage that, if a package is not placed correctly or not at all into the package holder and the filling process is continued, the tablet portions falling from the conveying trays can be caught by the package holder and are thus not spilled.

In the tablet portioning device of the present invention comprising a packing device and a packaging device, it can be provided that the table has a waste tray. For example, incorrectly portioned tablet portions can be filled into the waste tray. Using the table, the waste tray can be positioned below the transfer opening. If it is determined during the operation of the tablet portioning device that a wrong tablet portion has been filled into a conveying tray of the conveying device, it is thus possible to fill the wrong tablet portion into the waste tray without a protracted interruption.

Basically, it may also be provided in the tablet portioning device of the present invention comprising a packing device and a packaging device that the table receives a package so that no filling trays and slides are provided. In this case, the tablet portions are filled directly from the conveying device into the compartments of the package. In this case, the movable table acts as the package holder.

In the tablet portioning device of the present invention comprising a packing device and a packaging device, it is preferably provided that the table is fastened to a drive device by two laterally opposite L-shaped brackets arranged at the table, wherein the slide or the slides for opening the bottoms of the filling trays can be moved between the L-shaped brackets. Such a structure has proven particularly advantageous, since it allows for a space-saving structure. By providing the L-shaped brackets, a recess is formed through which the slides for opening the bottoms of the filling trays can be moved so that the slides can advantageously be moved towards the brackets and thus towards the fastening of the table. Therefore, the table is accessible in an advantageous manner from up to five sides so that the package holder can be guided below the table in an advantageous manner. This allows for a space-saving structure of the tablet portioning device.

In the tablet portioning device of the present invention comprising a packing device and a packaging device, it can be provided that a camera is arranged above the conveying device, which is directed towards the conveying device. Using the camera, image data of the conveying trays and their contents can be obtained, via which a content of the conveying trays can be determined by image analysis. In this manner, it may be checked which tablets or tablet portions are present in the conveying trays. In a conveying device having a cover, the cover has a recess through which the camera can view the conveying trays.

In the tablet portioning device of the present invention comprising a packing device and a packaging device, it may be provided in an advantageous manner that, in the transport position of the conveying device, the dispensing device is spaced in the conveying direction by a distance A, which is at least equal to the distance D, from a second deflection region of the studded belt. Here, the second deflection region is at least the region of the studded belt that is bent by a deflection in a second end section of the conveying device that is arranged below the dispensing device. Due to the distance A, which is at least equal to the distance D, a buffer tray is formed upstream of the dispensing device in the transporting direction, so that e.g., in case of a calibration, the studded belt can be moved against the conveying direction. Thus, it is prevented that a conveying tray previously present below the dispensing device, which has been filled with a tablet portion, reaches the deflection region by moving the studded belt by one conveying tray opposite to the conveying direction and that the tablet portion present in the conveying tray can fall out there. Basically, it is also possible that the dispensing device directly adjoins the deflection region in the conveying direction, in which case the deflection is preferably covered to form a buffer tray.

In this manner, calibrating the studded belt is possible in an advantageous manner.

BRIEF DESCRIPTION OF THE FIGURES

The invention will be explained in more detail with reference to the following Figures. In the Figures:

FIG. 5b is a perspective view of the packaging device of the tablet portioning device according to the invention in different filling positions.

FIG. 5c is a perspective view of the packaging device of the tablet portioning device according to the invention in different filling positions.

DETAILED DESCRIPTION

Figure 1:
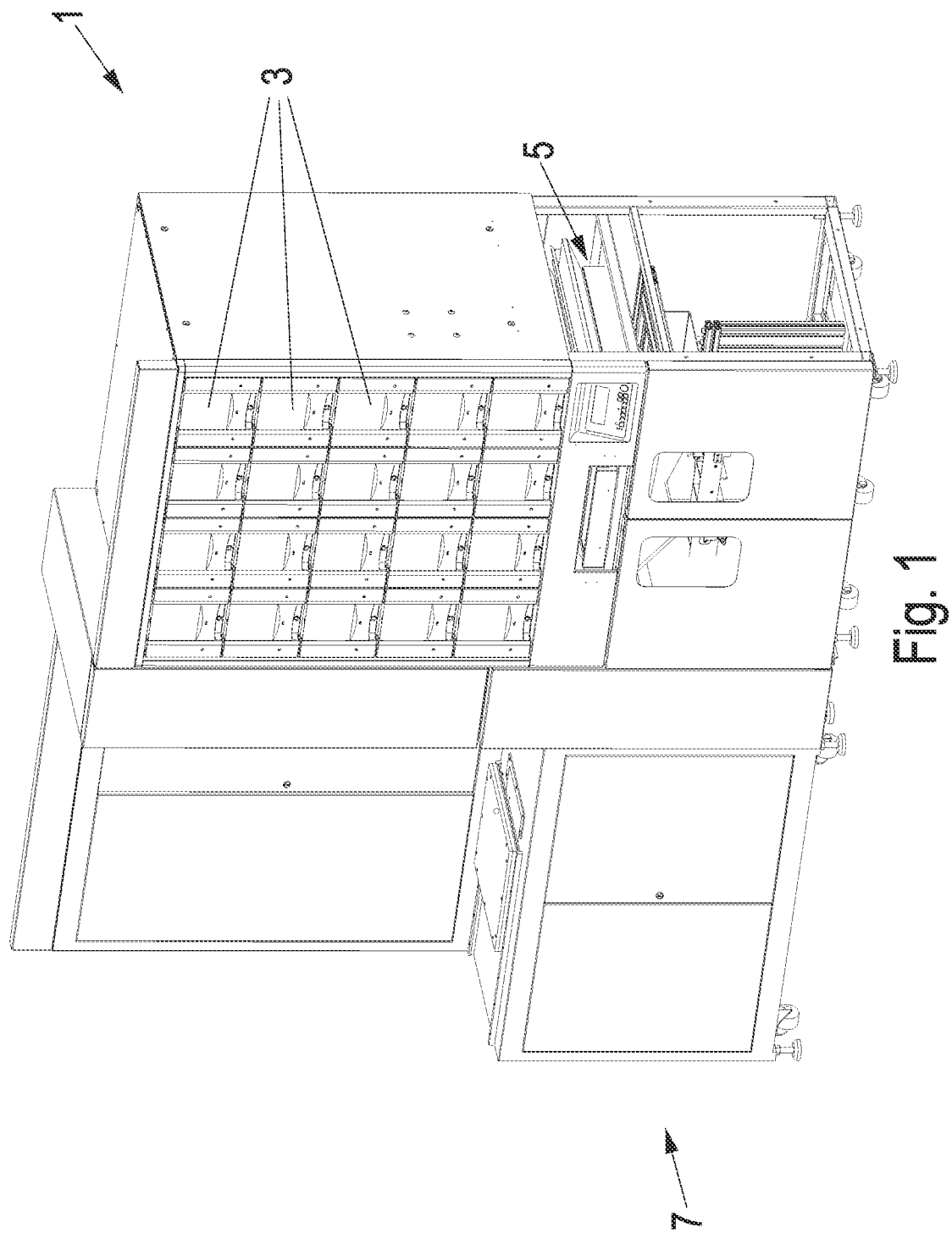
FIG. 1 is a schematic overall view of the tablet portioning device according to the invention.

FIG. 1 shows a schematic perspective view of a tablet portioning device 1 according to the invention. The tablet portioning device 1 comprises multiple tablet trays 3 arranged in a first part of the tablet portioning device above a collection device 5 seen best in FIG. 2. Beside the first part of the tablet portioning device 1 of the present invention that includes the tablet trays 3 and the collection device 5, a second part is arranged which comprises a packaging device 7 for tablet portions. The packaging device 7 is seen best in FIGS. 5a to 5c.

Figure 2:
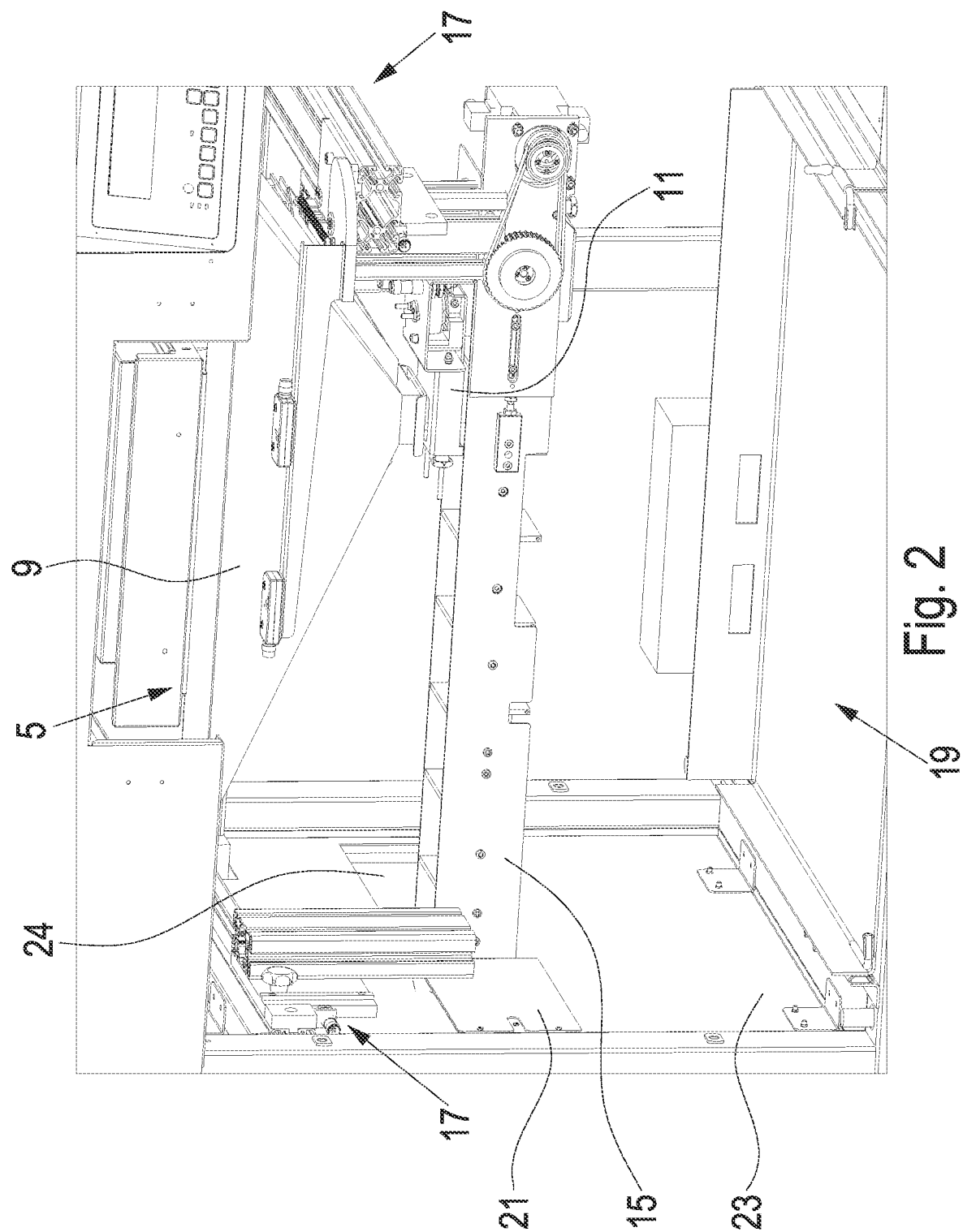
FIG. 2 shows a detail of the conveying device of the tablet portioning device of FIG. 1 in the conveying position.

As can be seen in FIG. 2, the collection device 5 comprises a funnel device 9, as well as a dispensing device 11. The funnel device 9 opens into the dispensing device 11. Tablets are dispensed from the tablet containers and fall into the funnel device 9 and are directed to the dispensing device 11. The dispensing device 11 dispenses the tablets present in the collection device 5 as a tablet portion. For this purpose, the dispensing device 11 can comprise a closure plate pivotable in a horizontal plane, the plate closing or opening a downward directed opening of the dispensing device 11.

In the situation illustrated in FIG. 2, a conveying device 15 is arranged below the dispensing device 11, which extends in a conveying direction (illustrated by an arrow in FIG. 2) and by means of which the tablet portions can be transported from the dispensing device 11 to the packaging device 7.

The conveying device 15 is supported by a rail device 17. By means of the rail device 17, the conveying device 15 can be displaced horizontally from the transport position illustrated in FIG. 2 in a direction transverse to the conveying device to a parking position. In the embodiment illustrated in FIG. 2, the conveying device 15 is thus displaced backward. Thereby, a space 19 below the dispensing device 11 is cleared almost completely, so that a packing device, not illustrated, can be arranged therein. The packing device may, for example, pack the tablet portions in portions in individual bags. To allow the use of the conveying device 15 and thus of the packaging device 7, the packing device is moved from its use position, in which it is arranged below the dispensing device 11, to a stow position which, for example, can also be arranged outside the tablet portioning device 1. The conveying device 15 is thereafter again moved to the transport position illustrated in FIG. 2.

A wall section 21 is arranged at the conveying device 15, which when the conveying device 15 is displaced, closes an opening 24 formed in a side wall for the conveying device 15, so that in the parking position of the conveying device 15 the side wall is closed almost completely. It can thereby be prevented that, e.g., when the packing device is used, an access between the space 19 and the adjacent space for the packaging device 7 is formed through which a user may inadvertently reach. It can further be prevented that in operation of the tablet portioning device 1 of the present invention comprising the packing device, access is possible from the space in which the packaging device 7 is arranged to the danger zone of the space 19 in which the packing device is operating.

Figure 3:
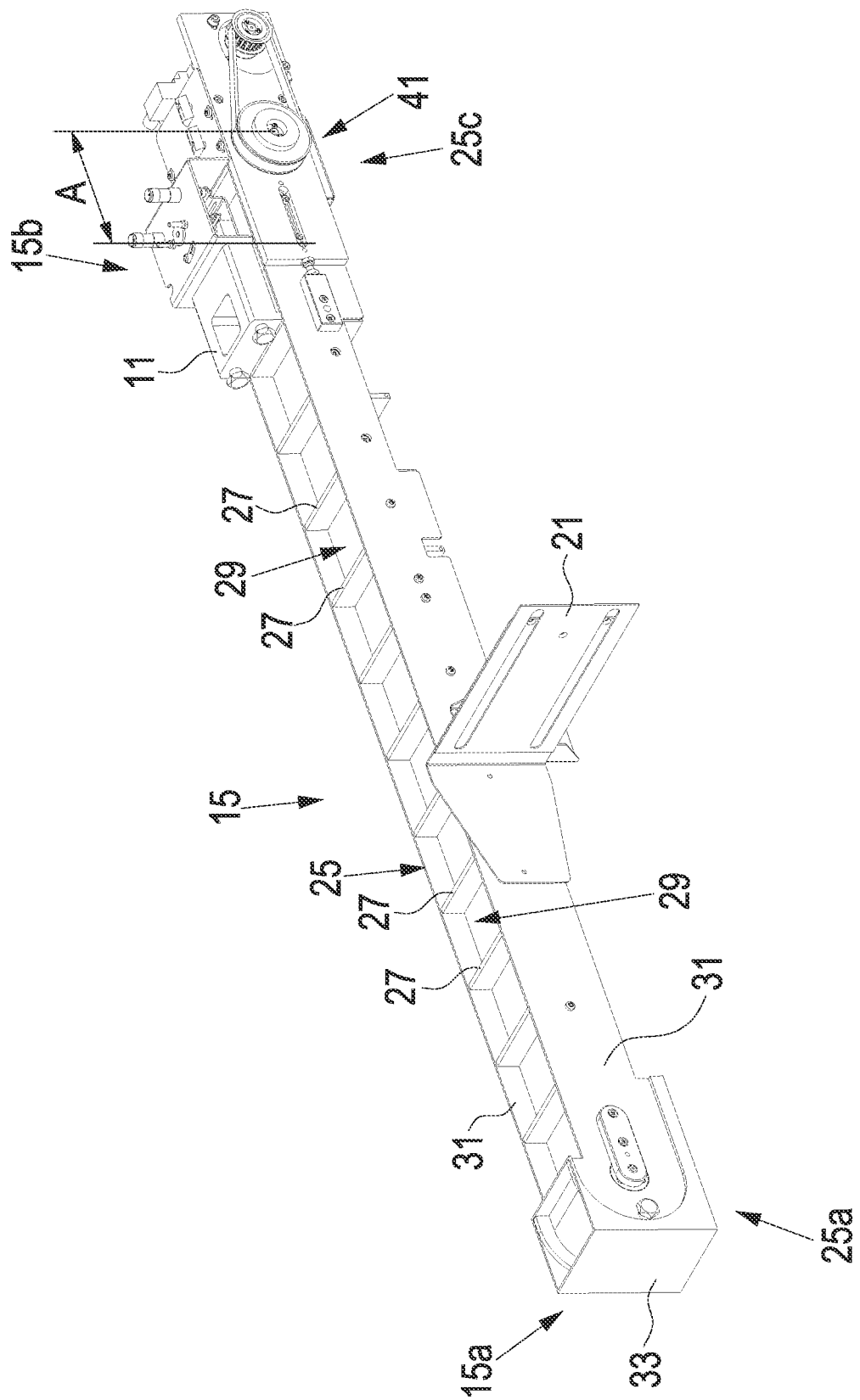
FIG. 3 shows another detail of the conveying device.

FIG. 3 shows the conveying device 15 of FIG. 2 in detail, wherein other parts of the tablet portioning device are largely omitted for the sake of clarity.

Figure 4:
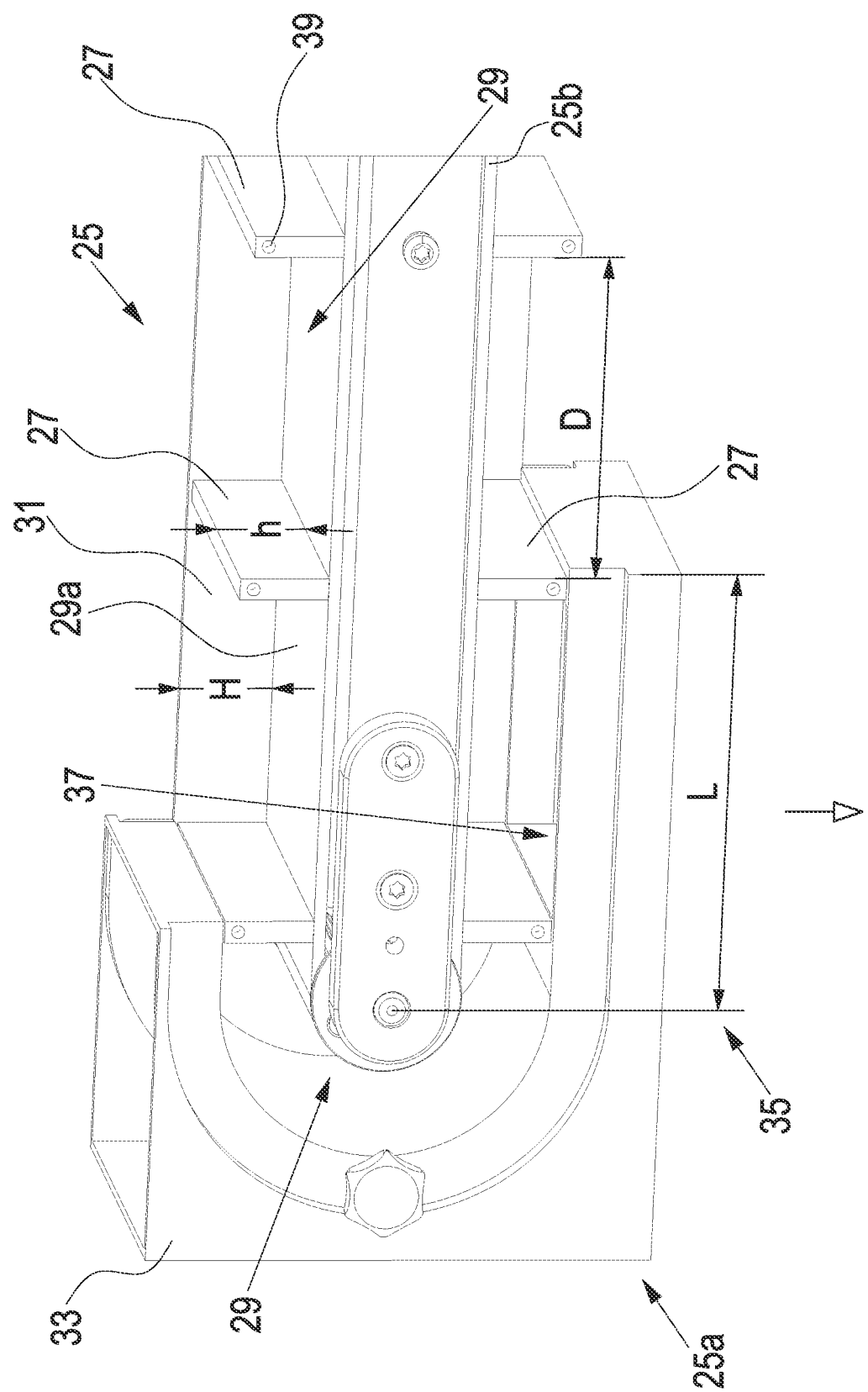
FIG. 4 shows a detail of the dispensing device of the conveying device of FIG. 3 without a side wall of the conveying device.

The conveying device 15 is formed by an endless studded belt 25 with protruding studs 27. The protruding studs 27 are, as can be seen in FIG. 4, spaced by a distance D and delimit conveying trays 29. The dispensing device 11 is adapted to the conveying tray 29 and the tablet portions are each dispensed in portions into one conveying tray 29, respectively.

Further, the conveying device 15 comprise a sidewall 31 on either side, which forms a lateral border of the conveying trays 29.

At a first end section 15a arranged in the region of the packaging device 7 of the tablet portioning device of the present invention, the conveying device 15 forms a deflection region 25a of the studded belt 25. In the first deflection region of the studded belt 25, a dispensing unit 33 is arranged which is configured as a dispensing head that covers a conveying tray 29 arranged in the deflection region 25a.

By means of the dispensing unit 33 it can be achieved that tablet portions arranged in a conveying tray 29 do not fall from the conveying tray 29 by the effect of gravity already in the deflection region 25a of the studded belt 25, but that a gravity-induced transfer to the packaging device 7 is performed only at a determined position, as is seen best in FIG. 4.

In FIG. 4, the first deflection region 25a of the studded belt 25, as well as the dispensing unit 33 are illustrated in detail, wherein the front side wall 31 is omitted for the sake of clarity. The dispensing unit 33 extends at least in the first deflection region 25a of the studded belt 25, wherein the first deflection region 25a is the region of the studded belt 25 that is bent by deflection. Further, starting from the first deflection region 25a, the dispensing unit 33 extends for a length L below the lower run 25b of the studded belt 25, the length L being greater than the distance D between two adjacent studs 27. In the part of the dispensing unit 33 extending by the length L, a transfer region 35 is formed which has a transfer opening 37. The transfer opening 37 thus forms an outlet for a tablet portion arranged in a conveying tray 29, so that the same can be transferred to the packaging device 7 under the effect of gravity, as indicated by the arrow.

The side wall 31 extends laterally of the studded belt 25 in a vertical direction and protrudes beyond a conveying tray bottom 29a by a height H that is at least the height h of a stud 27 of the studded belt 25.

A RFID chip 39 is arranged in each stud 27. The same may be sensed by a sensor, not illustrated, so that the position of a stud 27 can be identified clearly.

On the one hand, by virtue of the transfer opening 37, the dispensing unit 33 offer the possibility to provide a defined position for dispensing the tablet portions. Furthermore, by covering the conveying tray 29 in the first deflection region 25a, it is achieved that a tablet portion arranged in this conveying tray 29 is not yet dispensed under the effect of gravity so that in case of a malfunction the studded belt 25 can be moved back by one conveying tray 29 without any doubt about whether a tablet portion that had previously been arranged in the conveying tray 29 located in the deflection region 25a has already been dispensed or not.

A structure similar to the dispensing unit 33 is also provided in the second deflection region 25c arranged in the second end section 15b of the conveying device 15 averted from the first deflection region 25a. Using a corresponding cover 43, also a conveying tray 29 present in the second deflection region 25c is covered.

The dispensing device 11 is spaced from the second deflection region of the studded belt by a distance A, wherein the distance A at least corresponds to the distance D, so that it is ensured that when the studded belt 25 is moved opposite to the conveying direction by a path with the amount D, no tablet portions reach the second deflection region 25a.

Figure 5A:
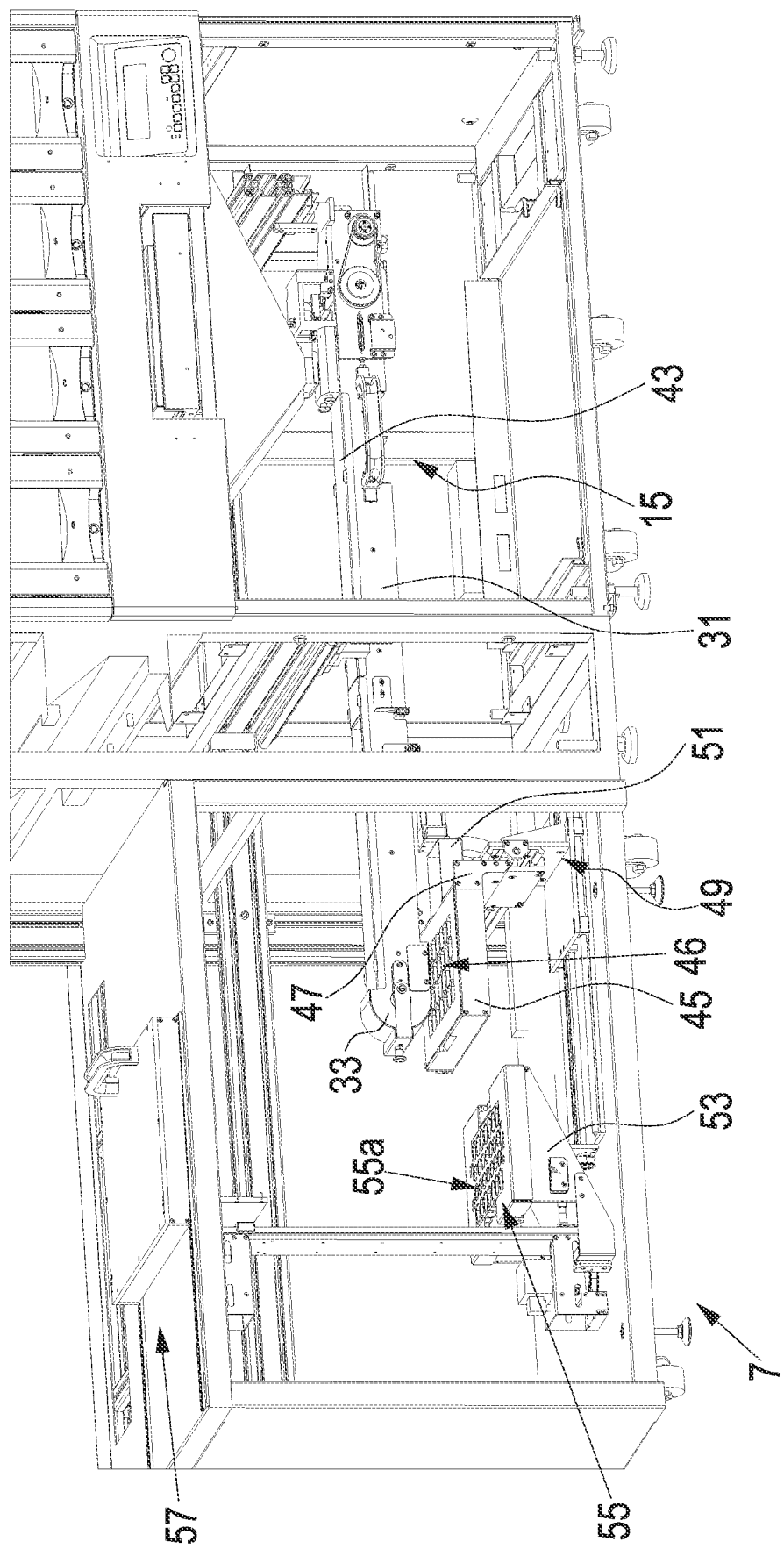
FIG. 5a is a perspective view of the packaging device of the tablet portioning device according to the invention in different filling positions.

As best seen in FIG. 5a, the conveying device 15 can comprise a cover plate 43 that connects the side walls 31 above the studded belt 25 and thus forms a protection for the tablet portions arranged in the conveying trays 29. Further, it is prevented by the cover plate 43 that individual tablets fall from a conveying tray 29 or fall into an adjacent conveying tray 29, when the studded belt 26 is started or stopped abruptly.

A camera, not illustrated, can be arranged above the conveying device 15, the camera being directed toward the studded belt 26. For this purpose, for example, the cover plate 43 may have a recess. By means of the camera, a tablet portion arranged in a conveying tray 29 can be detected optically and can be identified with respect to the combination of the tablets by means of image analysis. Thereby, it can be determined whether the intended tablet portion is arranged in a conveying tray 29.

FIGS. 5a to 5c illustrate the packaging device 7 in different filling positions.

The packaging device 7 comprises a table 45. A plurality of filling trays 46, each with a filling opening, is arranged in the table 35. The bottoms of the filling trays 46 are formed by a slide by which the filling trays 46 can be opened at their bottom side. The table 45 is arranged at a drive device 49 by means of L-shaped brackets 47 and is moved in two directions in a horizontal plane by the drive device 49. Thereby, each filling opening can be arranged below the transfer opening 37 of the dispensing unit 33. In this case, the transfer opening 37 is ideally adapted to the size of the filling openings of the filling trays 46. The table 45 is then moved such that the filling trays 46 can each be filled individually with a tablet portion arranged in a conveying tray 29.

If it is determined e.g., via the camera that a wrong tablet portion is arranged in a conveying tray 29, the same can be dispensed into a waste tray 51 of the table 45. As soon as the desired number of filling trays 46 is filled, the table 45 is moved above a package holder 53 holding a package 55, as seen best in FIG. 5b. The package 55 has multiple compartments 55a and, for example, is a so-called tray into which a plurality of tablet portions can be filled assorted according to their intake time.

The arrangement of the filling trays 46 in the table 45 is adapted to the compartments 55a of the package 55. If, as illustrated in FIG. 5b, the table 45 has been moved over the package holder 53 comprising the package 55, the filling trays 46 in the table 45 can be opened by moving the slide so that their contents fall into the compartments 55s of the package 55. Due to the L-shaped brackets 47 arranged at a distance from each other, an advantageous free space is formed, so that the slide can be moved between the L-shape brackets 47 to open the filling trays 46.

The package holder 53 is equipped in particular with a lift function so that the package holder 53 can transport the package after filling from the filling position illustrated in FIG. 5b to the removal position illustrated in FIG. 5c. For the removal of a filled package 55, the packaging device 7 comprises a removal device 57 into which the package can be moved by means of the package holder 53. The package 55 can be sealed in the removal device 57.

The package holder 53 further comprises a bottom 59 arranged below the package 55. If, in operation, a package 55 should not be inserted into the package holder 53 due to an erroneous operation or a malfunction, tablet portions transferred from the table 45 to the package holder 53 through the bottom 59 are caught so that spilling is prevented.

The tablet portioning device of the present invention is particularly flexible in use, since allows both a filling of packages 55 having multiple compartments 55a via the packaging device 7 and a packing of tablet portions in individual bags using the packing device.

LIST OF REFERENCE NUMERALS 1 tablet portioning device
3 tablet container
5 collection device
7 packaging device
9 funnel device
11 dispensing device
15 conveying device
15*a* first end section
15*b* second end section
17 rail device
19 space
21 wall section
24 opening
25 studded belt
25*a* first deflection region
25*b* lower run
25*c* second deflection region
27 studs
29 conveying tray
29*a* conveying tray bottom
31 side wall
33 dispensing unit
35 transfer region
37 transfer opening
39 RFID chip
41 cover
43 cover plate
45 table
46 filling trays
47 brackets
49 drive device
51 waste tray
53 package holder
55 package
55*a* compartments
57 removal device
59 bottom

The invention claimed is:

1. A tablet portioning device, comprising: a plurality of tablet containers and a collection device arranged below the tablet containers and having a dispensing device, as well as a packaging device for packaging tablet portions in portions, wherein the collection device receives tablets from the tablet containers and dispenses the same as tablet portions via the dispensing device, wherein a conveying device having multiple conveying trays and extending in a conveying direction connects the dispensing device with the packaging device, wherein the dispensing device dispenses a respective tablet portion into one of the conveying trays and the conveying device transports the tablet portions to the packaging device, wherein the conveying device has a dispensing unit via which the tablet portions are transferred to the packaging device in portions, and wherein the conveying device is supported on a rail device and can be moved via the rail device in a horizontal direction transverse to the conveying direction of the conveying device, from a transport position in which the conveying device transports tablet portions from the dispensing device to the packaging device, to a parking position.

2. The tablet portioning device according to claim 1, the tablet portioning device defining an empty region provided in a position below the dispensing device in the parking position of the conveying device, the empty region sized to accommodate a movable packing device configured to receive tablet portions from the dispensing device, said empty region having an open face configured to permit movement of the movable packing device out from a use position below the dispensing device to a stow position to clear a region below the collection device for the conveying device.

3. The tablet portioning device according to claim 1, wherein the conveying device is formed by an endless studded belt with protruding studs spaced from one another by a distance D, two adjacent studs respectively delimiting a respective one of the conveying trays on at least two sides.

4. The tablet portioning device according to claim 3, wherein the conveying device has side walls that are arranged laterally beside the studded belt and delimit the conveying trays on two further sides at least in a transport region of the studded belt.

5. The tablet portioning device according to claim 3, wherein the dispensing unit is arranged in a first deflection region of the studded belt.

6. The tablet portioning device according to claim 5, wherein the dispensing unit is in contact with the side walls at least in the first deflection region and connects the same with each other, wherein the dispensing unit covers a conveying tray present in the first deflection region.

7. The tablet portioning device according to claim 6, wherein the dispensing unit extends by a length L starting from the first deflection region below a lower run of the studded belt and forms a transfer region, wherein the length L corresponds to at least the distance D between two adjacent studs, wherein the dispensing unit has a transfer opening in the transfer region.

8. The tablet portioning device according to claim 7, wherein the transfer opening is adapted to the size of an opening of a package or to the size of a filling opening of the packaging device.

9. The tablet portioning device according to claim 3, wherein a RFID chip is arranged in each stud.

10. The tablet portioning device according to claim 3, wherein in the transport position of the conveying device, the dispensing device is spaced in the conveying direction by a distance A, which is at least equal to the distance D, from a second deflection region of the studded belt.

11. The tablet portioning device according to claim 1, wherein the packaging device comprises multiple filling trays each having one filling opening, their arrangement being adapted to a package with multiple compartments, wherein the bottoms of the filling trays are formed by one or more slides via which the filling trays can be opened at their bottom side, and wherein the tablet portions can each be filled into one of the filling trays, respectively.

12. The tablet portioning device according to claim 11, wherein the filling trays are arranged on a table that is horizontally movable in two directions.

13. The tablet portioning device according to claim 12, wherein the packaging device comprises a package holder for holding a package in a filling position, wherein the table can be positioned above the package holder for the purpose of filling the package.

14. The tablet portioning device according to claim 13, wherein, after filling, the package holder transports the package from the filling position to a removal position.

15. The tablet portioning device according to claim 14, wherein the packaging device may comprise a removal device at which the package can be sealed, wherein the removal position of the package is located in the removal device.

16. The tablet portioning device according to claim 12, wherein the table is fastened to a drive device by two laterally opposite L-shaped brackets arranged at the table, wherein the slide or the slides for opening the bottoms of the filling trays can be moved between the L-shaped brackets.

17. A tablet portioning device with multiple tablet containers, comprising: a collection device arranged below the tablet containers and having a dispensing device, the tablet portioning device having an empty space defined therein configured to retain a packing device for packing tablet portions, wherein the collection device receives tablets from the tablet containers and dispenses the same as a tablet portion via the dispensing device, wherein the empty space is arranged below the dispensing device and is configured to allow the packing device to receive the tablet portions from the dispensing device, wherein the empty space has an open face configured to permit movement of the packing device from a use position to a stow position to clear the region below the collection device, and comprising a conveying device with a plurality of conveying trays, wherein the dispensing device can be connected with a packaging device via the conveying device, wherein the dispensing device dispenses one tablet portion into one of the conveying trays, respectively, and the conveying device transports the tablet portions to the packaging device, and wherein the conveying device is supported on a rail device to be moved via the rail device in a horizontal direction transverse to the conveying direction of the conveying device from a transport position, in which the conveying device transports tablet portions from the dispensing device to the packaging device, to a parking position.

18. The tablet portioning device according to claim 17, wherein the conveying device comprises a dispensing unit via which the tablet portions are transferred to the packaging device in portions.

* * * * *